US007927064B2

(12) United States Patent
Talya et al.

(10) Patent No.: US 7,927,064 B2
(45) Date of Patent: Apr. 19, 2011

(54) PELTON TURBINE SYSTEM AND METHOD

(75) Inventors: Shashishekara Sitharamarao Talya, Clifton Park, NY (US); Daniel Jason Erno, Clifton Park, NY (US); Olav Rommetveit, Ostfold (NO); Elnar Mikal Sundsvold, Oslo (NO); Morten Bjerke, Frogner (NO)

(73) Assignee: General Electric Company, Niskayuna, NY (US)

( * ) Notice: Subject to any disclaimer, the term of this patent is extended or adjusted under 35 U.S.C. 154(b) by 1816 days.

(21) Appl. No.: 10/813,720

(22) Filed: Mar. 31, 2004

(65) Prior Publication Data

US 2005/0220605 A1    Oct. 6, 2005

(51) Int. Cl.
*F03B 15/06* (2006.01)
*F03B 15/20* (2006.01)
*F03B 1/04* (2006.01)

(52) U.S. Cl. ............ 415/1; 415/150; 415/151; 415/155; 415/157; 415/165; 415/167; 29/401.1; 29/889; 29/889.1

(58) Field of Classification Search .............. 415/1, 3.1, 415/116, 150, 151, 155, 157, 165, 167, 185, 415/186, 202; 416/197 B; 290/2, 43, 52, 290/54; 29/401.1, 889.1, 889; 137/487.5; 251/122, 315.01–315.16

See application file for complete search history.

(56) References Cited

U.S. PATENT DOCUMENTS

| 249,274 | A | * | 11/1881 | Tuerk, Jr. ...................... 415/202 |
| 827,165 | A | * | 7/1906 | Mariner ......................... 415/186 |
| 1,776,392 | A | * | 9/1930 | Moody ........................... 415/151 |
| 2,368,033 | A | * | 1/1945 | Makaroff ....................... 415/202 |
| 6,206,630 | B1 | | 3/2001 | Feltenberger et al. |
| 6,309,179 | B1 | | 10/2001 | Holden |

FOREIGN PATENT DOCUMENTS

| EP | 1308619 A1 | * | 5/2003 |
| JP | 10-26072 A | * | 1/1998 |

* cited by examiner

*Primary Examiner* — Christopher Verdier
(74) *Attorney, Agent, or Firm* — Fletcher Yoder, PC

(57) ABSTRACT

A Pelton turbine is disclosed that includes at least one needle valve injector assembly and at least one high efficiency injector assembly. The high efficiency injector assembly provides a generally unimpeded flow path for water from a distributor to a runner of the turbine. The high efficiency injector assemblies and needle valve injector assemblies are operated in cooperation to provide the overall desired flow rate through the turbine and to increase the efficiency of the turbine. A high efficiency injector assembly may be retrofitted for a needle valve injector assembly to improve the efficiency of existing turbine systems.

23 Claims, 6 Drawing Sheets

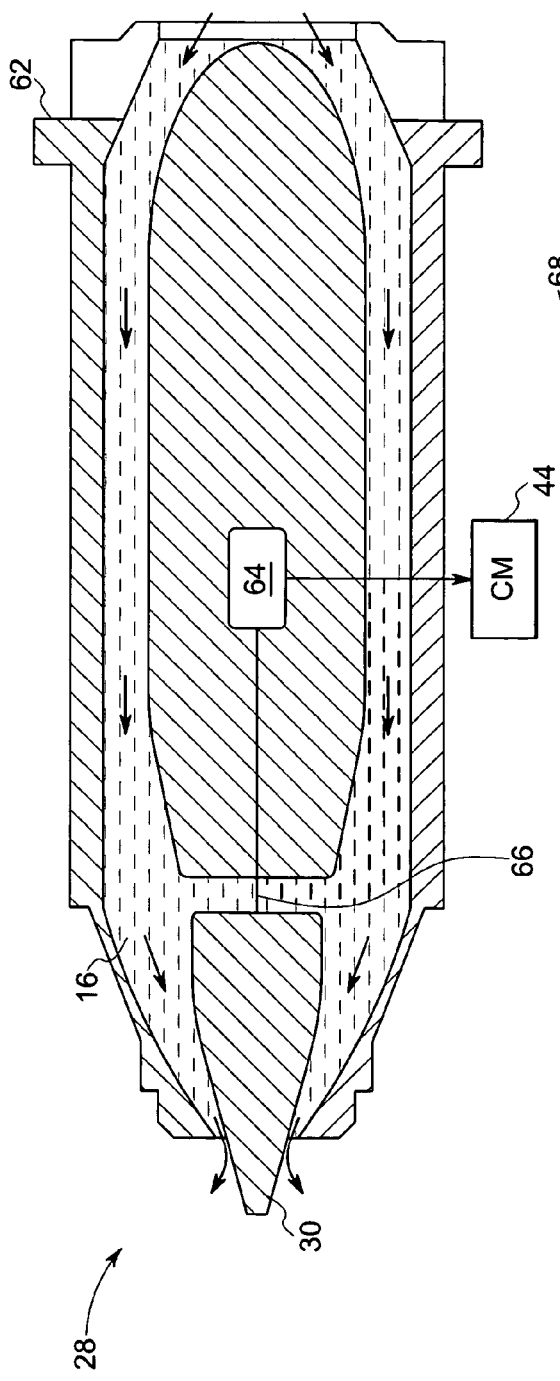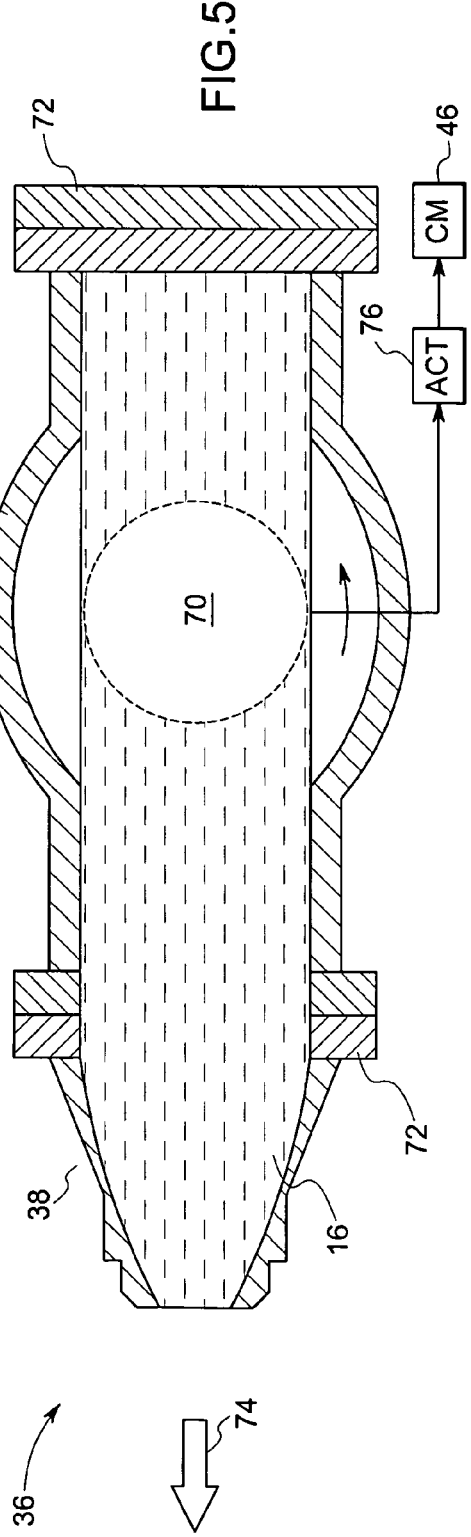

PELTON TURBINE SYSTEM AND METHOD

BACKGROUND

This field of invention relates generally to fluid impulse Pelton turbines, and specifically to a system and method to increase the overall efficiency of the Pelton turbine.

Many different systems and devices are known and in use for generating electrical power. Such systems include hydroelectric systems, typically associated with water dam. Hydroelectric systems generate electric power by permitting water to drop from one level to another, and then harnessing the energy of the elevational change to drive a turbine. The turbine, in turn, drives a generator that produces electrical power that can be controlled, filtered, and output to a power grid. One type of hydroelectric turbine is commonly referred to as a Pelton turbine.

A conventional Pelton turbine is a fixed blade turbine having a runner with curved blades, called runner blades, disposed in a protective casing. The runner of the turbine spins, driven by high-speed jets of water flowing from a higher elevation to a lower. The incoming water typically is provided through pipes, or penstocks and, depending on the width of the runner, water is directed through a manifold arrangement, referred to as a distributor, providing multiple outlets for the water to impact the runner. Water is metered to the runner from the distributor through needle valve injectors, which send jets of water into the turbine blades or buckets to turn the runner. A surrounding casing controls the splashing and exhaust of water.

Efficiency of a Pelton turbine is affected by the efficiency of the needle valves used to meter water flow from the distributor to the runner. If the water flow is decreased in a conventional Pelton turbine, the efficiency of the turbine reduces. In general, the water jet stream is directed towards the runner blades, thereby producing a force on the runner blades, which in turn results in torque of the shaft attached on the runner and used to drive the generator shaft. Thus, the available head (generally the elevational drop through the turbine) is converted to kinetic energy at the injectors. A typical efficiency of a Pelton turbine may be considered approximately 90% at the rated output, and can be maintained relatively constant even under part load operation in the case of a multiple jet design.

There is a need, therefore, for an improved technique for increasing the overall efficiency of the Pelton turbine. There is, at present, a particular need for a technique, which can be employed in a straightforward manner to increase the overall efficiency of a Pelton turbine to address the drawbacks in heretofore known systems.

BRIEF DESCRIPTION

In accordance with one aspect of invention, multiple injector designs are used in a Pelton turbine. In a presently contemplated configuration, at least one of the injectors is a needle-valve injector, while at least one other injector is a high efficiency injector. The high efficiency injector contributes a desired flow for driving the turbine, while the needle valve injector permits control of the overall flow. By using an optimal configuration of different types of injector designs in a single Pelton turbine, the overall efficiency of the Pelton turbine can be improved.

In accordance with another aspect of the present technique, a pelton turbine system includes a runner mounted for rotation to drive a generator. A combination of needle valve injector assemblies and high efficiency injector assemblies are disposed alternately with respect to a distributor. The high efficiency injector assembly comprises a high efficiency valve to regulate the flow of water through the injector assembly. The high efficiency injector assembly and the needle valve injector assembly are controlled by individual control modules, which are in turn coupled to a central control system to regulate the overall flow of the water released to drive the turbine.

In accordance with another aspect of the technique, a Pelton turbine is provided wherein the high efficiency injector assembly comprises a spherical valve and is configured to provide either a fully open flow path or a fully closed flow path between the distributor and the runner. In accordance with yet another aspect of the technique, a retrofittable Pelton turbine injector assembly is provided for improving the efficiency of a Pelton turbine. The retrofittable injector assembly, which is a high efficiency injector assembly, is configured to replace a needle valve injector assembly to improve the overall efficiency of the Pelton turbine The technique also provides a method for operating and controlling the flow of water in a Pelton turbine. In one implementation of the technique, at least one needle valve injector assembly is initially opened, while simultaneously opening at least one high efficiency injector assembly. Subsequently, the needle valves injector assembly is regulated to obtain a steady flow of water, such at to supply power or grid requirements. The substantially similar operation is executed to reduce flow through the turbine, wherein the high efficiency injector is closed, while simultaneously regulating the flow of water through the needle valve injector assembly until the required output is. During steady state operation, the high efficiency injector provides flow at efficiency higher than the needle valve injector assembly, while the needle valve injector assembly permits adjustment of the overall flow rate.

DRAWINGS

These and other features, aspects, and advantages of the present invention will become better understood when the following detailed description is read with reference to the accompanying drawings in which like characters represent like parts throughout the drawings, wherein:

FIG. 4 is a diagrammatical representation of a typical needle valve injector assembly coupled to a control system as illustrated in FIG. 2 and FIG. 3 for use in conjunction with a high efficiency injector;

FIG. 5 is a diagrammatical representation of an exemplary high efficiency injector assembly illustrating the position of a spherical valve as illustrated in FIG. 2 and FIG. 3 for use in conjunction with a needle-valve injector assembly;

Figure 6:
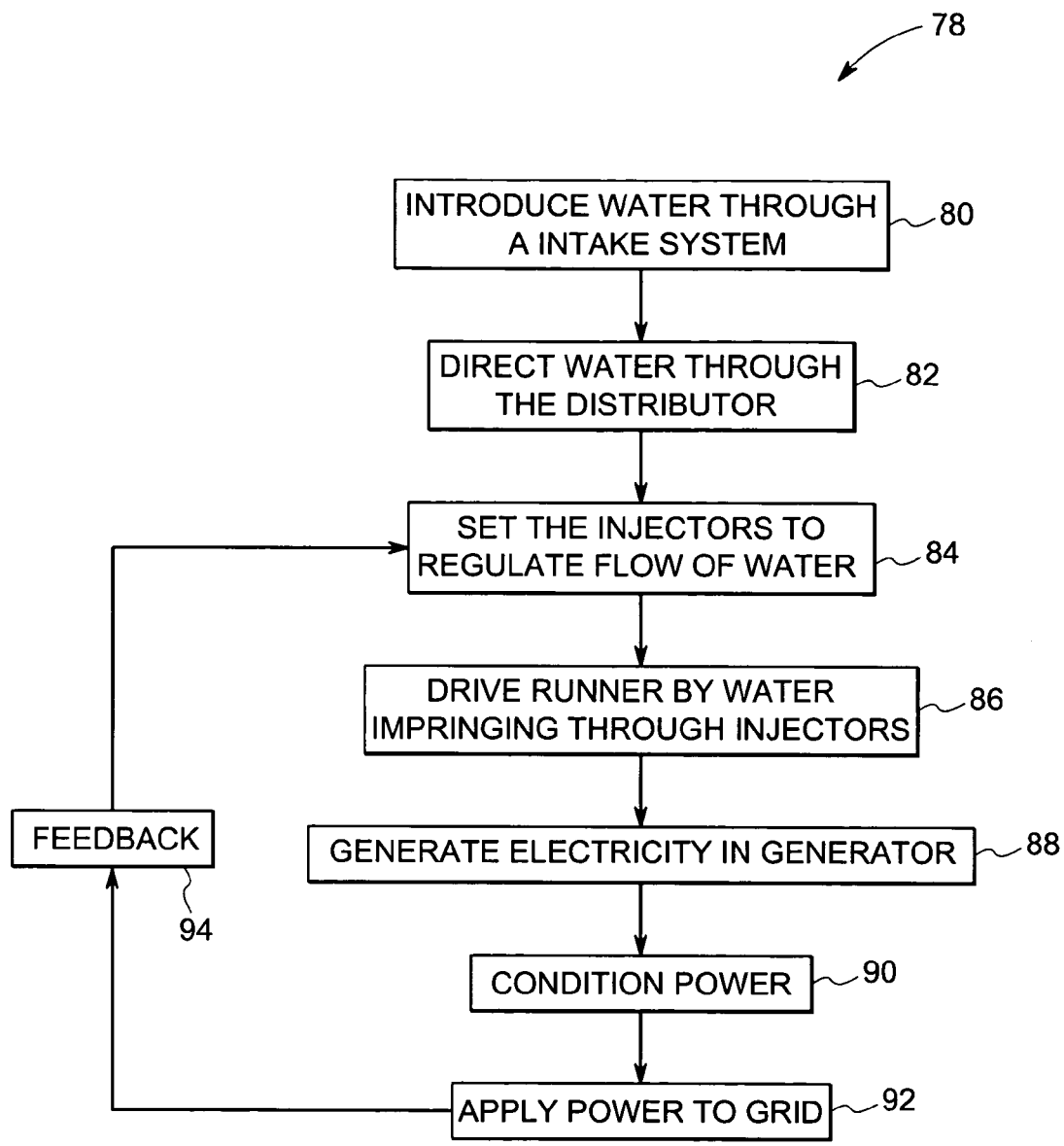
Figure 7:
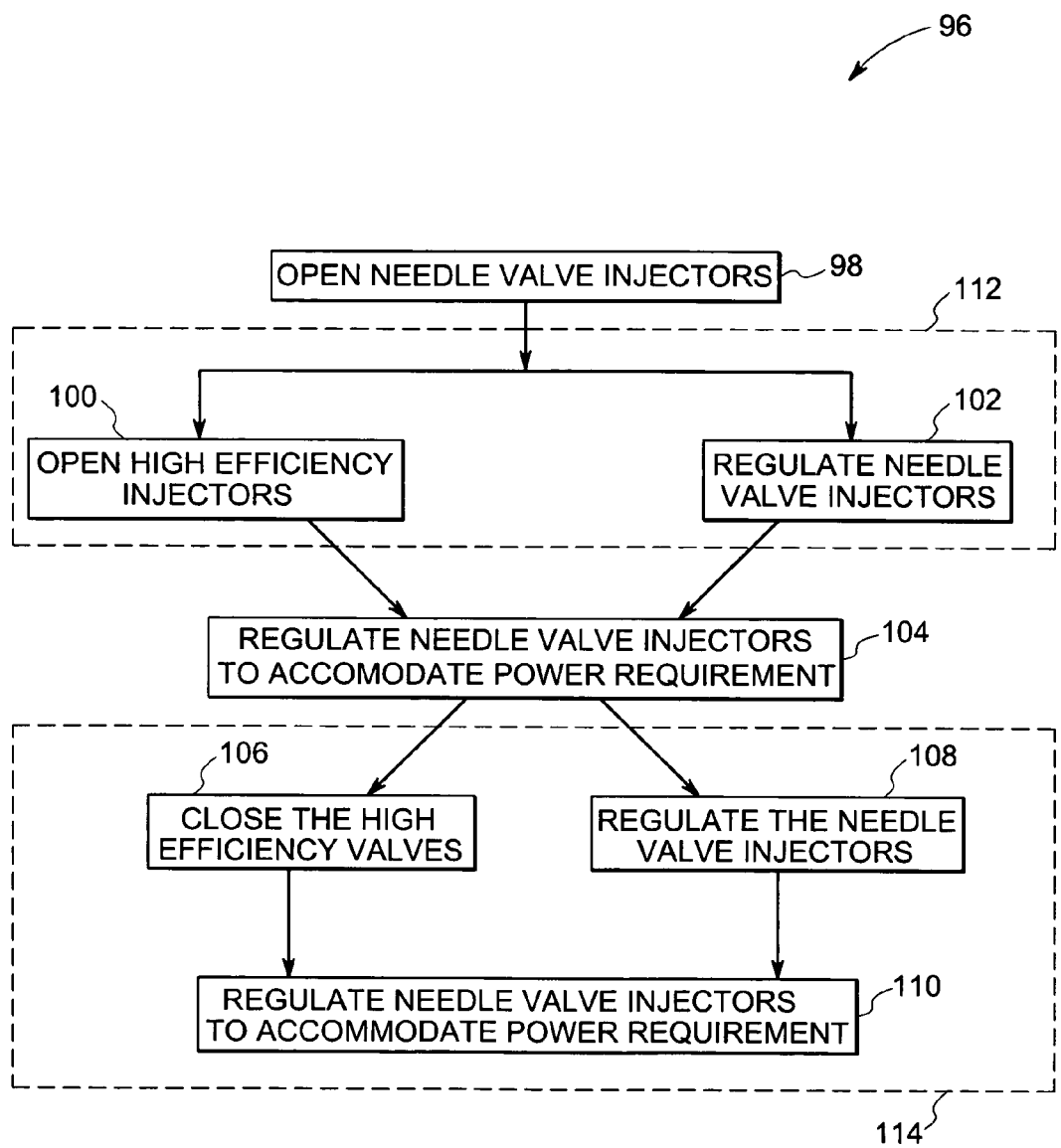

FIG. 6 is a flow diagram illustrating an exemplary operation of a Pelton turbine accompanied by a feedback for control of water flow in accordance with aspects of the present technique; and FIG. 7 is a flow diagram illustrating an exemplary operation of a needle valve injector assembly and a high efficiency injector assembly of a Pelton turbine in accordance for bringing one or more injectors on-line and off-line.

DETAILED DESCRIPTION

Figure 1:
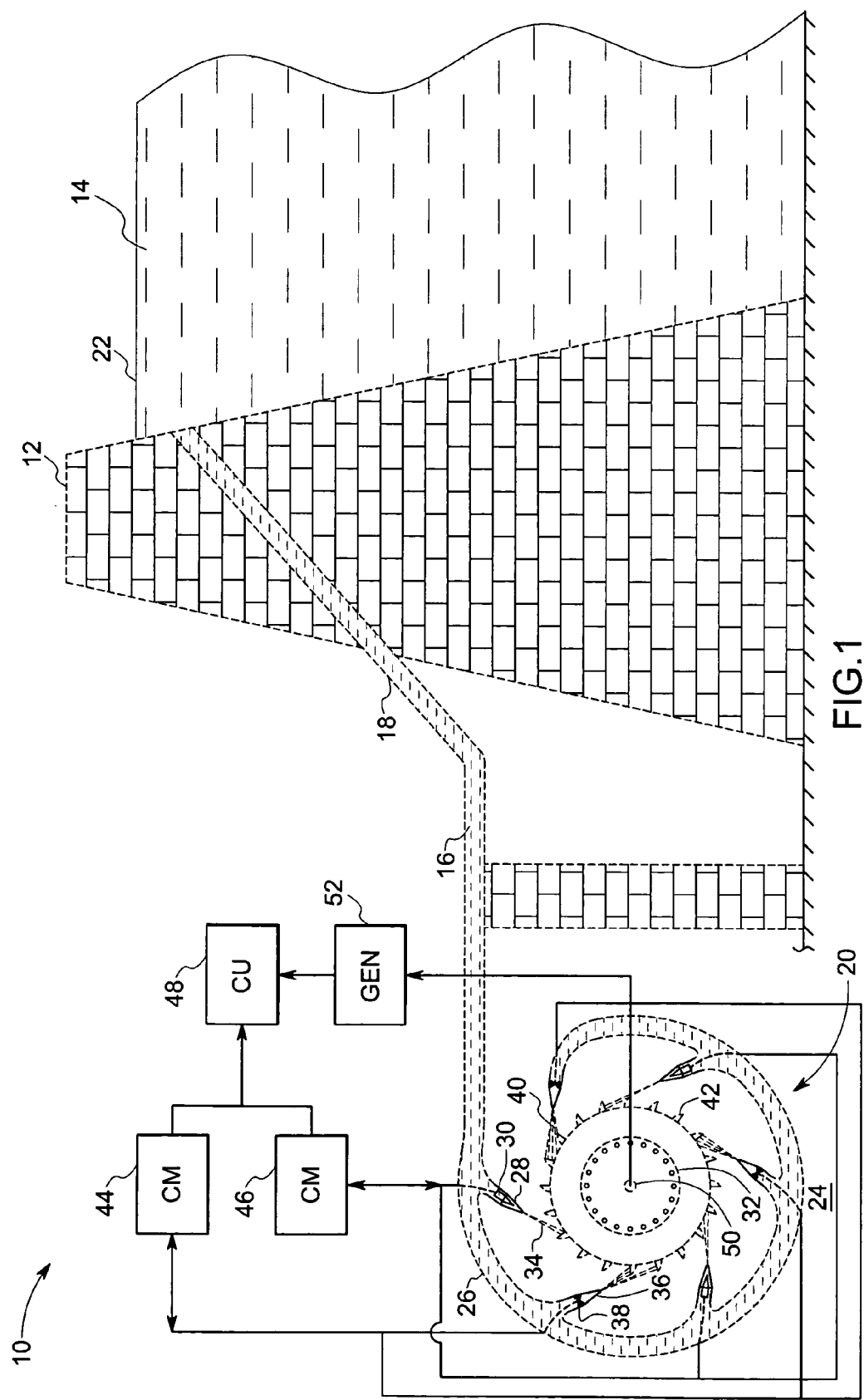
FIG. 1 is a diagrammatical view illustrating exemplary functional components of a Pelton turbine in accordance with aspects of the present technique.

Turning now to the drawings, and referring first to FIG. 1, a diagrammatical representation of exemplary functional components of a Pelton turbine system 10 is illustrated. In the exemplary embodiment illustrated in FIG. 1, the Pelton turbine system 10 includes a dam 12 that retains water 14, and allows a flow of water 16 through an entrance conduit or penstock 18 to a turbine unit 20. In practice, more than one such turbine unit may included in a typical installation, and the equipment illustrated in FIG. 1 would typically be housed in a part of the dam 12, or adjacent to the dam. By controlling the flow of water 14 across the dam and through the turbine 20, incoming water 14 flows from a higher elevation 22 to a lower elevation 24, and potential energy is converted to kinetic energy in the turbine to generate power as described below.

Water flow 16 through a penstock 18 diffuses through a distributor 26 to the plurality of needle valve injector assemblies 28, which may be of generally conventional construction. As described in greater detail below, each needle valve injector assembly 28 comprises a metering assembly 30 that permits the flow of water through the respective injector to be modulated or controlled, thereby controlling the overall flow of water through the turbine unit. The flow from the injectors impinges a runner 32 and forces rotation of the runner. A jet of water, designated by the reference numeral 34 is produced by each needle valve injector assembly 28 and is directed towards the runner.

The distributor 26 acts a common manifold for transferring the water 16 from the penstock 18 to the needle valve injector assemblies 28. In addition to the needle valve injector assemblies 28, one or more high efficiency injector assemblies 36 are fluidly coupled to the distributor for receiving a portion of the water flow. In certain exemplary embodiments, the turbine unit 20 includes at least two high efficiency injector assemblies 36 having identical sizes. The high efficiency injector assemblies 36 each include a high efficiency valve 38 intended to provide completely or substantially unimpeded flow of water to the runner 32 in a manner that produces a higher quality water jet. Accordingly, each high efficiency injector assembly 36 produces a higher quality water jet 40 that is directed to the runner 32 to aid in forcing rotation of the runner. The jets 34 and 40 from the different injector assemblies effectively impact buckets or blades 42 of the runner to produce torque that results in the desired rotation of the runner under load conditions.

The flow of water 16 is controlled through the plurality of needle valve injector assemblies 28 and the plurality of high efficiency injector assemblies. In the illustrated embodiment, control modules 44 and 46 are coupled to the needle valve injector assemblies 28 and to the high efficiency injector assemblies 46, respectively, to regulate opening and closing of the valves of each injector assembly. Thus, as described in greater detail below, the flow rate of water issuing from each injector assembly, and the total amount of water through the turbine can be controlled and modulated. In general, a control module 44 and 46 will be provided immediately adjacent to each individual injector assembly, as described below. The various control modules 44 and 46, then, are coupled to a central control unit 48 that regulates operation of the valves of all injectors and coordinated their opening and closing. As will be appreciated by those skilled in the art, the control modules 44 and 48 will typically include actuators, such as hydraulic cylinders or motors that respond to and are actuated by circuitry within the control modules. The central control unit 48 will generally include digital circuitry configured to implement predefined control regimes, and to apply control signals to the circuitry of each control module. In certain exemplary embodiments, the central control unit 48 includes circuitry having a programmed microprocessor. The control modules and central control unit may permit operator intervention and control, and will typically include one or more application specific or general purpose computers or processors, as well as supporting circuitry, memory, and so forth.

A rotatable shaft 50 of the turbine 20 is coupled to the runner 32, and to a generator 52. In operation, the available head of water 16 is converted to velocity head at the needle valve injector assemblies 28 and high efficiency injector assemblies 36. This head is then converted to kinetic energy at the runner, and is then converted to electrical energy by the generator 52 to produce the electrical power, for application to a load, or for conditioning and application to a power grid. Feedback relating to the frequency, current and voltage requirements of the electrical power are provided to the central control unit 48, which in turn regulates operation of the turbine through control of flow from the injector assemblies 28 and 36 to produce the desired speed and torque of the runner.

As described in greater detail below, in one embodiment the high efficiency valve 38 in the high efficiency injector assembly 36 is a spherical valve. The spherical valve 38 operates in either a fully open condition or a fully closed condition. The overall flow of the Pelton turbine is controlled by the control of flow from the needle valve injector assemblies 28. The control modules 44 generally modulate the amount of water issuing from the needle valve injector assemblies 28, to control the overall flow to the runner. On the other hand, the control modules 46 control the opening and closing of the high efficiency valves 38 of the high efficiency injector assemblies 36 to provide high efficiency, bulk, flow. Again, modules 44 and 46 are coupled to central control unit 48, which controls the overall flow as required of the Pelton turbine system based on the power requirements of the generator 52.

The flow rate of water from the at least one needle valve injector assembly 28 is different from the flow rate of water from the at least one high efficiency injector assembly 36. The flow rate of water from the high efficiency injector assemblies 36 may be greater or lesser than the flow rate of water from the needle valve injector assemblies 28. The flow path of the at least one needle valve injector assembly 28 is different from a flow path of the at least one high efficiency injector assembly 36. In certain exemplary embodiments, an effective cross-sectional area of the at least one needle valve injector assembly 28 is smaller than an effective cross-sectional flow area of the at least one high efficiency injector assembly. In particular, the present technique may call for as few as a single needle valve injector assembly to regulate flow, or as few as a single high efficiency injector assembly to provide more efficient delivery of a portion of the overall flow due to the fully open or relatively unimpeded flow path of the spherical valve in the high efficiency injector assembly 36.

Figure 2:
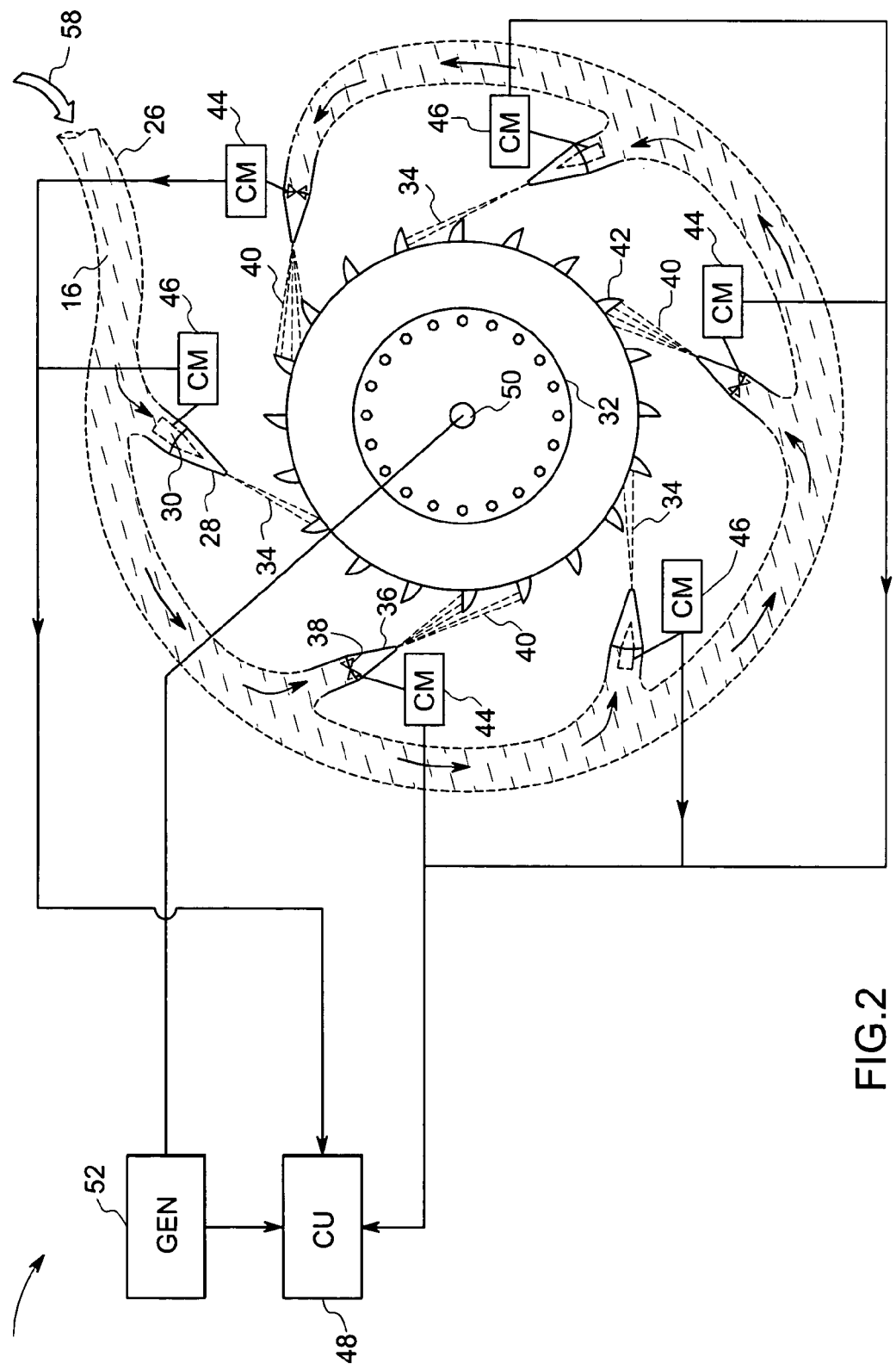
FIG. 2 is a diagrammatical representation illustrating an exemplary configuration of a Pelton turbine having needle valve and high efficiency injectors coupled to the distributor and controlled to regulate overall flow through the turbine.
Figure 3:
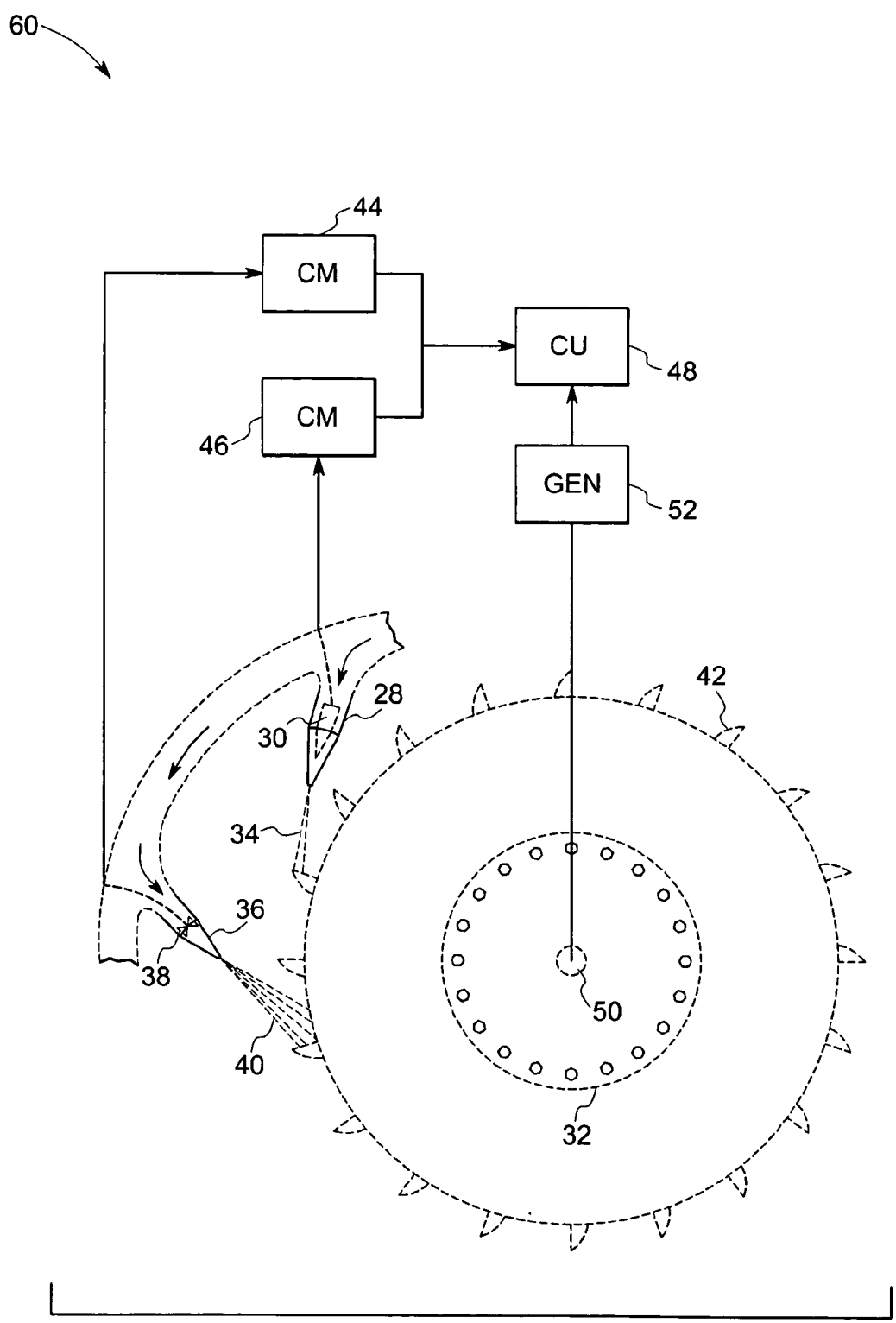
FIG. 3 is a diagrammatical representation illustrating an exemplary configuration and a control system of a Pelton turbine injector assembly shown in the previous figures.

FIG. 2 is a diagrammatical representation of an exemplary configuration of a Pelton turbine injector assembly 56 of the type described above. The water flow 58 from the penstock as indicated in FIG. 1 is directed to the distributor 26. The water then impinges on to the runner 32 through a plurality of needle valve injector assemblies 28 and high efficiency injector assemblies 36. The needle valve injector assemblies 28 and the high efficiency injector assemblies 36 are disposed alternately around the distributor 26. This arrangement is one of the methods of arranging the needle valve injector assemblies 28 and the high efficiency injector assemblies 36. The exact numbers and the arrangement of the needle valve injector assemblies 28 and the high efficiency injector assemblies 36 will depend upon such factors as the power requirements of the generator, the capacity of the Pelton turbine, and the particular system design. As noted above, the flow of water through the needle valve injector assemblies 28 is controlled through the operation of the needle valves 30 in the needle valve injector assemblies 28, which are typically coupled to hydraulic servomotors under the control of control modules 46. Similarly, each of the high efficiency injector assemblies 36 is also connected to an actuator, typically a rotary valve actuator responsive to control signals from a respective control module 44. The control modules of the needle valve injector assemblies 28 and the high efficiency injector assemblies 36 are connected to the central control unit 48, which controls the overall flow of water through the turbine, as well as the relative opening or closing of the various injectors FIG. 3 is a diagrammatical representation of an exemplary configuration of a portion 60 of the Pelton turbine system shown in FIGS. 1 and 2. As noted above, water flows to the distributor and therefrom to at least one needle valve injector assembly 28 and at least one high efficiency injector assembly 36. In a presently contemplated embodiment, each needle valve injector assembly 28 comprises a needle valve 30 and each high efficiency injector assembly 36 comprises a spherical valve 38. The valve assemblies are controlled by the respective control module 44 and 46, under the control of central control unit 48 based upon feedback from the generator 52 or associated circuitry. As will be appreciated by those skilled in the art, even relatively small increase in efficiency of Pelton turbine units may result in very significant economic and energy gains. Accordingly, the high efficiency injector assemblies may be physically configured, along with their respective control modules, to permit replacement of one of more needle valve injector assemblies in a conventional Pelton turbine installation, thereby permitting retrofitting of the system to improve efficiency of the overall system. As will also be appreciated by those skilled in the art, a typical installation for a Pelton turbine may operate between predictable upper and lower limits or within known ranges of power output, associated with corresponding ranges of flow rates. Thus, as described below, the number and flow rates of the high efficiency injector assemblies may be provided to accommodate the anticipated ranges of flow as well as some crude adjustment in the overall flow rates, while the needle valve injector assemblies may be selected, both in number and flow rate range, to provide the desired supplemental flow rates, as well as more fine adjustments throughout periods of use (e.g. days or weeks of operation).

FIG. 4 is a diagrammatical sectional view of an exemplary needle valve injector assembly 28. As indicated in FIG. 4, the body of the needle valve injector assembly 28 comprises a needle valve 30 disposed in an injector body 62. Water current 16 flows through a generally annular area between the needle valve 30 and the inner surface of the body 62. The needle valve 30 is coupled to an actuator 64, typically in the form of a hydraulic servo-valve and cylinder, which is coupled to the needle valve 30 by a mechanical link (such as an internal rod or other mechanical structure) 66. The actuator regulates the position of the needle valve 30 with respect to an exit of the body 62, thereby regulating flow through the orifice defined between the needle valve 30 and the body 62. The actuator 64 responds to electrical or hydraulic signals from the control module 44, to provide the desired output flow.

FIG. 5 is a diagrammatical sectional view of an exemplary high efficiency injector assembly 36. As shown in FIG. 5, in a presently contemplated embodiment, the assembly includes a high efficiency valve body 68 in which a spherical valve is sealingly positioned. The high efficiency injector valve body 68 comprises a spherical ball 70 disposed for movement between open and closed positions to allow relatively unimpeded flow of water therethrough, or to stop the flow of water, as desired. The spherical valve 38 is coupled to an actuator 76, which opens and closes the valve by rotation of the spherical ball 70. The actuator 76 in turn is connected to control module 46 which controls operation of the actuator to regulate flow through the injector, as described above.

In a presently contemplated embodiment, water 16 flows through the high efficiency injector assembly 36 in a fully open condition of the spherical valve 38, or the flow may be completely interrupted by closure of the high efficiency valve. As the spherical valve 38 has a fully open condition, the relative resistance to flow is significantly reduced as compared to the needle valve injector assembly 28.

In a presently contemplated embodiment of the high efficiency injector assembly 38, flanges 72, or similar mechanical support structures, allow for mounting of the assembly in a location in which a needle valve injector assembly is to be replaced. That is, the envelope of the injectors may be substantially identical, such that retrofitting of a turbine unit is afforded by replacement of a needle valve injector assembly by a high efficiency injector assembly. As will be appreciated by those skilled in the art, other arrangements may, of course, be envisaged, including non-interchangeable units, particularly for new designs and installations. Similarly, other valve configurations may be employed, such as gate valves, and so forth. In general, however, the injector assembly 38 will provide an efficiency advantage over the needle valve injector assembly, such as by virtue of its open or relatively unimpeded flow path. Moreover, some metering or modulation of flow may be performed by adjustment of the high efficiency injector assembly, to supplement or complement the modulation afforded by the needle valve injector assemblies.

Thus, one or more needle valve injector assemblies 28 of an existing Pelton turbine can be replaced with a high efficiency injector assembly 36. A combination of the needle valve injector assembly 28 and the high efficiency injector assembly 36 leads to an optimal configuration of the injector designs in a Pelton turbine unit. Hence, the overall efficiency of the Pelton turbine can be improved. As an example, in a six-injector Pelton Turbine, 3 high efficiency injector assemblies 36 comprising a spherical valve 38 can replace 3 of the 6 needle valve injector assemblies 26. These 3 high efficiency injectors 38 will operate at close to 100% efficiency when the spherical valves 38 are fully open and thus improve the overall efficiency of the turbine.

FIG. 6 is a flow chart illustrating an exemplary method of steady state operation of a Pelton turbine having injector assemblies of the types described above. The method, designated by the reference numeral 78, begins with introduction of water through an intake system at step 80. As indicated at step 82, water is then directed to the distributor. As then indicated at step 84, the needle valve injector assemblies 28 and the high efficiency injector assemblies 36 are set to provide the desired flow of water. Total water flow to the runner from the distributor is delivered through a combination of needle valve injector assemblies 28 and the high efficiency injector assemblies 36, driving the runner, as indicated at step 86. In certain exemplary embodiments, the method includes substantially simultaneously regulating flow of water through the needle valve of the at least one needle valve injector assembly 28 and the spherical valve of the at least one high efficiency injector assembly 36 to direct the flow of water from the distributor to the runner. The movement of the runner in turns rotates the rotatable shaft of the runner, which is coupled to the generator. Hence, electricity is produced by the generator, as indicated at step 88. The power is conditioned at step 90, and finally is applied to the grid, as indicated at 92. Based on the requirement at the grid (e.g. frequency, current and voltage), feedback is provided to control the flow of water by regulating the injector assemblies, as indicated at step 94.

As will be appreciated by those skilled in the art, during such steady state operation, the high efficiency injector assemblies may provide a base or bulk of the flow required by the turbine, at an efficiency greater than that available from conventional needle valve injector assemblies. At the same time, modulation of the overall flow through the turbine is provided by metering adjustment of the needle valve injector assemblies.

FIG. 7 illustrates an exemplary method for bringing high efficiency injector assemblies on-line (i.e. opening) and for taking such assemblies off-line (i.e. closing) during transient operation of the system described above. The process, designated generally by the reference numeral 96, begins at step 98 at which a needle valve injector assembly is opened. In practice, more than one such assembly may be opened, and more generally, the process may begin with steady state operation steps as illustrated in FIG. 6. In a process to open a high efficiency injector assembly, designated by reference numeral 112, a high efficiency valve in the high efficiency injector assembly is opened, as indicated at step 100. Coordinated with such opening, one or more needle valve injector assembly is regulated by partial closing, to compensate for the increase in flow through the high efficiency injector assembly. Such coordination avoids sudden or a disruptive increase in flow and thus in torque applied to the runner. Thereafter, the needle valve injector assemblies may be regulated 102 to provide the desired total flow through the turbine, as indicated at step 104, and as described above with reference to FIG. 6.

A process for taking a high efficiency injector assembly off-line is designated by reference numeral 114 in FIG. 7. As illustrated, initially the high efficiency injector assembly is closed at step 106. In coordinate with such closing, one or more needle valve injector assemblies is regulated by opening the needle valves to compensate for the closing of the high efficiency injector assembly, as indicated at step 108. As before, metering by the needle valve injector assembly avoids sudden changes in flow and torque that could result from sudden closing of the high efficiency injector assembly. Following the closure of the high efficiency injector assembly, the needle valve injector assemblies may be regulated to achieve the desired flow of water through the turbine, as indicated at step 110.

The processes of FIGS. 6 and 7, or other processes for controlling operation of injector assemblies of the type described herein will typically be implemented by computer programs or routines executed by the control modules and units described above. Moreover, the process may generally be fully automated by such programming, or may be partially automated with input by operations personnel at the turbine facility or installation.

As will be appreciated by those skilled in the art, the overall system structure offered by the present technique enables a variety of benefits over the conventional system. By using a combination of the high efficiency injector assemblies and the needle valve injector assemblies, the overall efficiency of the Pelton turbine is increased. In particular, due to the relatively unimpeded flow through the high efficiency injector assemblies, the flow rate of water from these high efficiency injector assemblies is provided at a higher efficiency than the flow rate of water from the needle valve injector assemblies, thereby increasing the overall efficiency of the Pelton turbine system.

In addition, the present techniques allow for the design of higher efficiency Pelton turbine systems, as well as the upgrading of existing systems. As noted above, for efficiency of existing systems having conventional needle valve injector assemblies may be improved by retrofitting at least one of the needle valve injector assemblies with corresponding high efficiency injector assemblies.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A Pelton turbine system comprising:
   a runner mounted for rotation and configured to drive a generator;
   a distributor for directing a flow of water to the runner;
   at least one high efficiency injector assembly comprising a spherical valve configured to provide the flow of water from the distributor to the runner; and
   at least one needle valve injector assembly comprising a needle valve for regulating the overall flow of water from the distributor to the runner.

2. The system of claim 1, wherein the spherical valve is configured either to provide a fully open flow path between the distributor and the runner in a fully opened position or to fully close the flow path between the runner and the distributor in a closed position.

3. The system of claim 1, wherein the at least one high efficiency injector assembly and the at least one needle valve injector assembly are alternately disposed in the distributor.

4. The system of claim 1, wherein a number of needle valve injector assemblies and a number of high efficiency injector assemblies are selected based upon power requirements of the Pelton turbine and a range of flow between the distributor and the runner.

5. The system of claim 1, further comprising at least two high efficiency injector assemblies having identical sizes.

6. The system of claim 1, wherein a flow rate of the at least one needle valve injector assembly is different from a flow rate of the at least one high efficiency injector assembly.

7. The system of claim 1, wherein an effective cross-sectional flow area of the at least one needle valve injector assembly is smaller than an effective cross-sectional flow area of the at least one high efficiency injector assembly.

8. The system of claim 1, comprising a control circuit configured to automatically operate the high efficiency injector assembly to provide a fully open flow path between the distributor and the runner in a fully opened position or to fully close the flow path between the runner and the distributor in a closed position.

9. The system of claim 8, wherein the control circuit includes an appropriately programmed microprocessor.

10. A Pelton turbine system comprising:
    a runner mounted for rotation and configured to drive a generator;
    a distributor for directing a flow of water to the runner;
    at least one needle valve injector assembly comprising a needle valve for regulating the flow of water from the distributor to the runner; and at least one high efficiency injector assembly comprising a spherical valve configured either to provide a fully open flow path between the distributor and the runner in a fully opened position or to fully close the flow path in a closed position.

11. The system of claim 10, wherein the at least one high efficiency injector assembly and the at least one needle valve injector assembly are alternately disposed in the distributor.

12. The system of claim 10, wherein a number of needle valve injector assemblies and a number of high efficiency injector assemblies are selected based upon power requirements of the Pelton turbine and a range of flow between the distributor and the runner.

13. The system of claim 10, further comprising at least two high efficiency injector assemblies having identical sizes.

14. The system of claim 10, wherein a flow path of the at least one needle valve injector assembly is different from a flow path of the at least one high efficiency injector assembly.

15. The system of claim 10, further comprising a control circuit configured to execute a control to automatically operate the high efficiency injector assembly to provide a fully open flow path between the distributor and the runner in a fully opened position or to fully close the flow path between the runner and the distributor in a closed position.

16. The system of claim 15, wherein the control circuit includes an appropriately programmed microprocessor.

17. A method for operating a Pelton turbine, the method comprising:
opening a needle valve of a needle valve injector assembly and a valve of a high efficiency injector assembly to a direct flow of water from a distributor to a runner; and
controlling the needle valve of the needle valve injector assembly to regulate a desired flow of water from the distributor to the runner;
wherein the pelton turbine comprises at least two needle valve injector assemblies alternately disposed with at least two high efficiency injector assemblies to provide a modulated flow of water from the needle valve injector assemblies.

18. The method of claim 17, further comprising controlling the high efficiency injector assemblies and the needle valve injector assemblies to provide the desired flow of water to from the distributor to the runner.

19. A method for operating a Pelton turbine, the method comprising:
substantially simultaneously regulating flow through a needle valve of a needle valve injector assembly and a high efficiency valve of a high efficiency injector assembly to direct a flow of water from a distributor to a runner; and
controlling the needle valve injector assembly to provide a desired flow from the distributor to the runner;
wherein the pelton turbine comprises at least two needle valve injector assemblies alternately disposed with at least two high efficiency injector assemblies to provide a modulated flow of water from the needle valve injector assemblies.

20. The method of claim 19, further comprising automatically operating the high efficiency injector assemblies to provide a fully open flow path between the distributor and the runner in a fully opened position or to fully close the flow path between the runner and the distributor in a closed position.

21. A method for operating a Pelton turbine comprising:
removing at least two needle valve injector assemblies from a Pelton turbine between a distributor and a runner of a Pelton turbine to leave at least two other needle valve injector assemblies to direct flow from the distributor to the runner; and
disposing at least two high efficiency injector assemblies between the distributor and the runner in place of the removed at least two needle valve injector assemblies to direct a portion of overall flow from the distributor to the runner;
wherein the at least two high efficiency injector assemblies and the at least two needle valve injector assemblies are alternately disposed in the distributor.

22. The method of claim 21, wherein at least two needle valve injector assemblies and at least two high efficiency injector assemblies are selected based upon power requirements of the Pelton turbine and a range of flow of water between the distributor and the runner.

23. A pelton turbine system comprising:
a runner mounted for rotation and configured to drive a generator;
a distributor for directing a flow of water to the runner;
at least two high efficiency injector assemblies, each comprising a spherical valve configured to provide the flow of water from the distributor to the runner; and
at least two needle valve injector assemblies, each comprising a needle valve for regulating the overall flow of water from the distributor to the runner;
wherein the at least two high efficiency injector assemblies and the at least two needle valve injector assemblies are alternately disposed in the distributor.

* * * * *